(12) United States Patent
Adelmann

(10) Patent No.: US 7,562,089 B2
(45) Date of Patent: Jul. 14, 2009

(54) SYSTEMS AND METHODS FOR STORING INFORMATION TO ALLOW USERS TO MANAGE FILES

(75) Inventor: Todd Christopher Adelmann, Boise, ID (US)

(73) Assignee: Seagate Technology LLC, Scotts Valley, CA (US)

( * ) Notice: Subject to any disclaimer, the term of this patent is extended or adjusted under 35 U.S.C. 154(b) by 1366 days.

(21) Appl. No.: 10/180,232

(22) Filed: Jun. 26, 2002

(65) Prior Publication Data

US 2004/0003002 A1 Jan. 1, 2004

(51) Int. Cl.
*G06F 17/00* (2006.01)
(52) U.S. Cl. .................. 707/102; 707/101; 707/103 X; 707/104.1; 707/203; 707/204
(58) Field of Classification Search ................. 707/102, 707/10, 203, 204, 205, 200, 101, 103 X, 104.1, 707/202; 711/118, 165; 703/27; 709/218, 709/302; 715/752; 714/38
See application file for complete search history.

(56) References Cited

U.S. PATENT DOCUMENTS

| | | | | |
|---|---|---|---|---|
| 5,185,885 A * | 2/1993 | Dysart et al. | ................. | 707/100 |
| 5,628,007 A * | 5/1997 | Nevarez | ................. | 707/102 |
| 5,822,780 A * | 10/1998 | Schutzman | ................. | 711/165 |
| 5,829,023 A * | 10/1998 | Bishop | ................. | 711/118 |
| 5,922,054 A * | 7/1999 | Bibayan | ................. | 719/328 |
| 6,021,415 A * | 2/2000 | Cannon et al. | ................. | 707/206 |
| 6,098,079 A * | 8/2000 | Howard | ................. | 707/205 |
| 6,545,978 B1 * | 4/2003 | Sakurai | ................. | 370/236.2 |
| 6,618,735 B1 * | 9/2003 | Krishnaswami et al. | ...... | 707/203 |
| 6,816,984 B1 * | 11/2004 | Snyder et al. | ................. | 714/38 |
| 6,845,908 B2 * | 1/2005 | Morita et al. | ................. | 235/382 |
| 6,965,924 B1 * | 11/2005 | Gerthe | ................. | 709/218 |
| 7,219,302 B1 * | 5/2007 | O'Shaughnessy et al. | ... | 715/752 |
| 2001/0007120 A1 * | 7/2001 | Makita | ................. | 711/112 |
| 2003/0084047 A1 * | 5/2003 | Williamson | ................. | 707/10 |
| 2003/0173400 A1 * | 9/2003 | Morita et al. | ................. | 235/380 |
| 2004/0133608 A1 * | 7/2004 | Saake et al. | ................. | 707/200 |
| 2006/0052999 A1 * | 3/2006 | Brooks et al. | ................. | 703/27 |

OTHER PUBLICATIONS

Mark Derthick et al., "Example based generation of custom data analysis appliances", ACM, 2001, pp. 57-64.*
Thomas Kunz et al., "Fast Detection of Communication Patterns in Disstributed Executions", ACM, Nov. 1997, pp. 1-263.*
http://en.wikipedia.org/wiki/Stat_(Unix); Stat (Unix)—Wikipedia, the free encyclopedia.

* cited by examiner

*Primary Examiner*—Thuy N Pardo
(74) *Attorney, Agent, or Firm*—Fellers, Snider, et al.

(57) ABSTRACT

Systems and methods for storing information to allow users to manage files are provided. One method embodiment comprises determining whether there is communication between a storage device and a first appliance; determining whether the storage device has any information stored in it, if there is communication; and generating the information, if there is no information stored on the storage device, the information comprising the type of an initial modification made to a file.

23 Claims, 5 Drawing Sheets

SYSTEMS AND METHODS FOR STORING INFORMATION TO ALLOW USERS TO MANAGE FILES

TECHNICAL FIELD

The present invention is generally related to computer arts and, more particularly, is related to systems and methods for storing information to allow users to manage files.

BACKGROUND OF THE INVENTION

Files are often stored on memories such as memory cards, solid-state disks, hard disks, floppy disks, and compact disks (CDs). Storing the files on the memories allows the files to be portable between appliances such as digital cameras, computers, printers, digital telephones, and personal digital assistants (PDAs). For example, if an image is captured with a digital camera and stored on a memory card, the image can be transferred to an image-editing program such as, for instance, Microsoft® Photoeditor™ or Adobe™ Photoshop™ that resides on a computer. Examples of other types of files include a letter created using for instance, Microsoft® Word™, Windows™ Notepad™, Windows™ Wordpad™, Wordperfect™ for Windows™, Wordperfect™ for disk operating system (DOS), or MacWrite™. Moreover, examples of other types of files include a spreadsheet created using for example, Lotus™ 123 or Microsoft® Excel™. Furthermore, examples of other types of documents include a drawing created using for instance, Microsoft® PowerPoint™, Microsoft® Visio™, AutoCAD™, AutoCAD™ 3-D Studio™, MacDraw™, or CorelDraw™. Additionally, examples of other types of documents include a website that is accessed using for example, Internet™ Explorer™, or Netscape™ Communicator™. Examples of other types of documents also include e-mails created using for instance, Personal Computer (PC) Pine™, or Microsoft® Outlook™.

The number of files that a user stores on a memory may increase as the person creates more files. As the number of files becomes large, it becomes more difficult for the user to manage the files since the user may not know whether the file was created, whether the file was edited, whether the file was moved or whether the file was deleted. Additionally, the user may not know when the file was created, when the file was edited, when the file was moved and when the file was deleted. For instance, if the user creates a file, stores the file on a floppy disk, and later accidentally deletes the file, the user will not be able to determine what happened to the file in that there is no record to show what happened to the file. Specifically, there is no record to show whether and when the file was created, whether and when the file was edited, whether and when the file was moved, and whether and when the file was deleted.

As is known in the art, Windows™ Operating System (O/S) by Microsoft® allows a user to gain access to a file that the user recently accessed. In particular, the Windows™ O/S generates a list of names of files that the user recently opened on his/her computer so that the user can access a file by logging on his/her computer, selecting the "Start" button, selecting "Files," and then selecting the name of the file.

Despite this capability, the Windows™ O/S only stores a list of names of files that were recently accessed by the user. Specifically, the list of files is limited to a predetermined number of files and therefore older files may not be available if several other files have been accessed. Furthermore, the list only includes the names of the files and hence does not comprise any other information, for instance, information as to when a file was created or edited. Additionally, the list is a feature of the Windows™ O/S and so is incompatible with other operating systems. Transporting the list from one appliance that has the Windows™ O/S to another that does not is useless since the list is incompatible with an O/S that is not a Windows™ O/S.

Therefore, a need exists in the industry for systems and methods for managing a large number of files that avoids the above-mentioned inadequacies.

SUMMARY OF THE INVENTION

The present disclosure relates to systems and methods for storing information to allow users to manage files. Briefly described, in architecture, one embodiment of a system, among others, can be implemented as follows: a memory module for determining whether there is communication between a storage device and a first appliance; a memory module for determining whether the storage device has any information stored in it, if there is communication; and a memory module for generating the information, if there is no information stored on the storage device, the information comprising the type of an initial modification made to a file.

The disclosure can also be viewed as providing methods for storing information to allow users to manage files. In this regard, one embodiment of a method, among others, can be broadly summarized by the following steps: determining whether there is communication between a storage device and a first appliance; determining whether the storage device has any information stored in it, if there is communication; and generating the information, if there is no information stored on the storage device, the information comprising the type of an initial modification made to a file.

BRIEF DESCRIPTION OF THE DRAWINGS

Many aspects of the systems and methods for storing information can be better understood with reference to the following drawings. The components in the drawings are not necessarily to scale, emphasis instead being placed upon clearly illustrating the principles of the systems and methods for storing information. Moreover, in the drawings, like reference numerals designate corresponding parts throughout the several views.

DETAILED DESCRIPTION

Disclosed herein are systems and methods for storing information to allow users to manage files. Generally speaking, the systems and methods allow the user to manage files by storing information beyond the name of files that the user recently accessed. Moreover, the systems and methods are portable so that they can be transferred from one appliance to another and, therefore, used with any appliance.

In one arrangement, the systems and methods can be used to store information pertinent to modifications made to a file such as the name of the file, type of the file, location of the file, type of modifications that have been made to the file, if any, and day, date, and time when any such modifications were made. Examples of different types of files were mentioned in the background section. Types of file modifications may include, for instance, creating, editing, moving, and deleting the file. Examples of creating a file include opening a new file in Wordperfect™, a new spreadsheet in Lotus™ 123, and a new drawing in MacDraw™. Moving the file may comprise relocating the file from, for instance, one folder to another folder of an appliance or from one directory to another directory of an appliance. With this stored information, the user can easily determine what happened to a desired file and does not have to rely on his/her memory.

Furthermore, the systems and methods are portable because a storage device that comprises the systems and methods can be disconnected from a first appliance and reconnected to a second appliance. Portability of the systems and methods is useful since the information pertinent to the modifications that is stored by the systems and methods can be used in conjunction with any O/S of an appliance. The information can be used in conjunction with any O/S of an appliance because the information is not generated, updated, and stored by the O/S of the appliance but by a processor of the storage device comprising the systems and methods.

Figure 1:
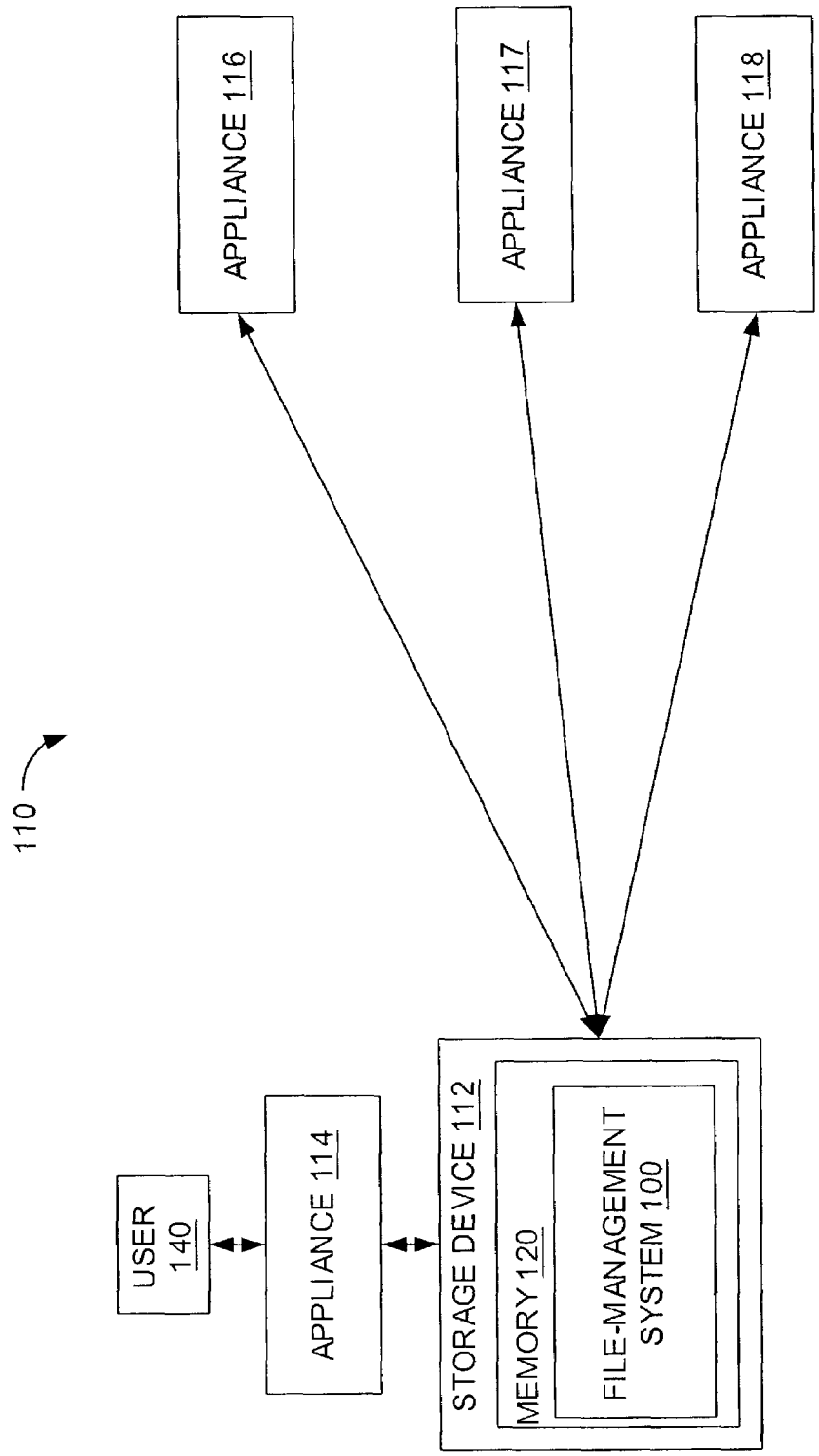
FIG. 1 is a block diagram of an embodiment of a system that includes a file-management system for allowing users to manage files.

FIG. 1 is a block diagram of an embodiment of a system 110 that includes a file-management system 100 that allows users to manage files. The system 110 comprises appliances 114, and 116-118. Examples of appliances include digital cameras, computers, printers, digital telephones, and personal digital assistants (PDAs). A storage device 112 communicates with the appliance 114. The communications between the storage device 112 and the appliance 114 can be wired or wireless electrical communication during which the storage device transmits data to and/or receives data from the appliance. The storage device 112 may be separate from the appliance 114. Alternatively, the storage device 112 may be integrated with the appliance 114. As indicated in FIG. 1, the storage device 112 comprises a memory 120 that includes the file-management system 100.

Where the storage device 112 is a separate component from the appliance 114, the file-management system 100 is portable since a user 140 who operates the appliance 114 can disable communication between the storage device 112 and the appliance 114. The user 140 can then enable communication between the storage device 112 and any one of the other appliances 116-118. As used herein, disabling communication refers to removing any wired or wireless communication between a storage device and an appliance, and enabling communication refers to establishing wired or wireless communication between a storage device and an appliance. Enabling communication may or may not involve a transfer of data between a storage device and an appliance.

Figure 2:
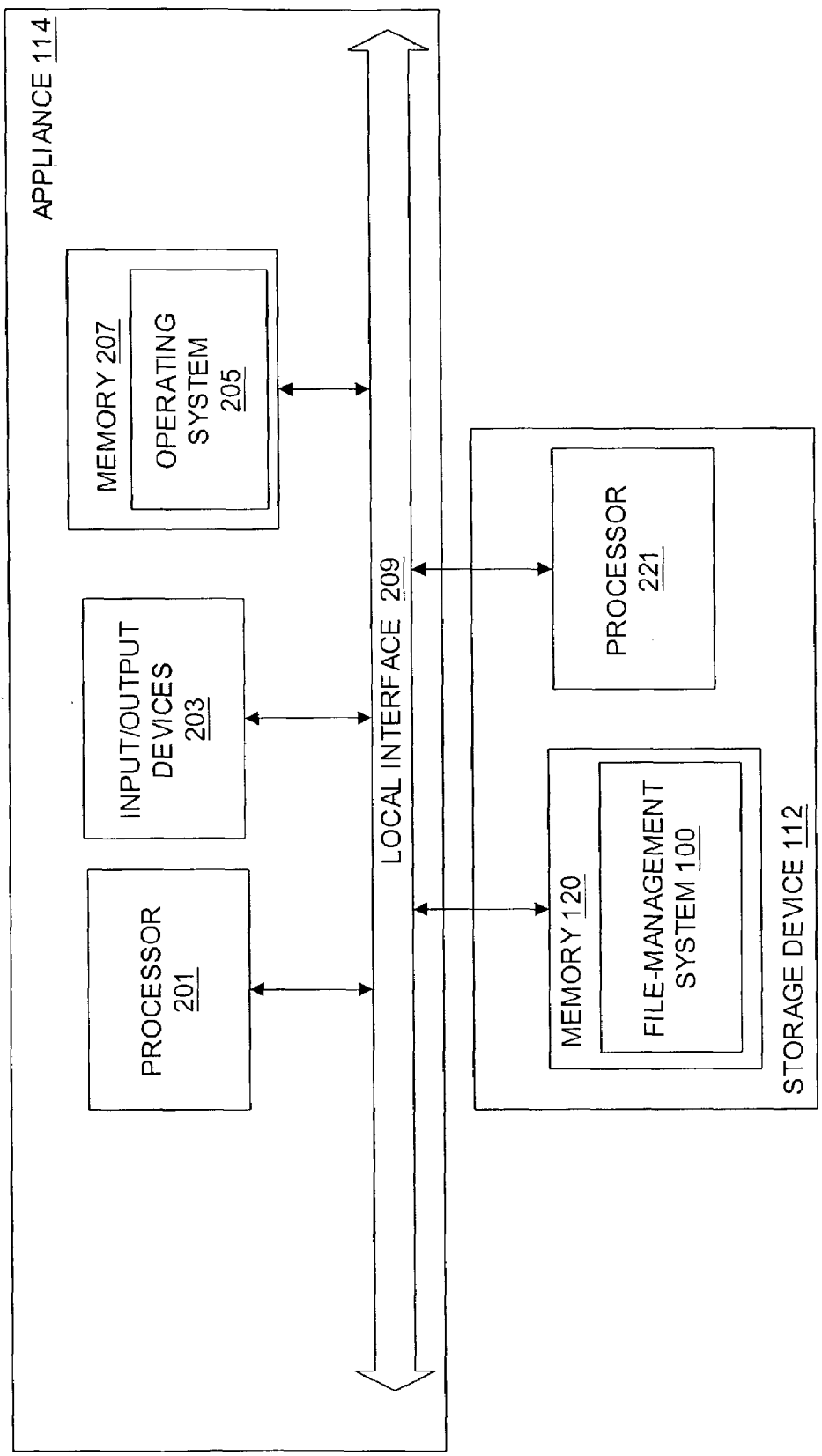
FIG. 2 is a block diagram of an embodiment of the file-management system shown in FIG. 1 in communication with an appliance.

FIG. 2 is a block diagram of an embodiment of the file-management system 100 as comprised in the storage device 112, as shown communicating with the appliance 114. The appliance 114 includes a processor 201, at least one input or output (I/O) device 203, and a memory 207, each of which is communicatively coupled via a local interface 209. Each of the appliances 116-118 (FIG. 1) may have the same structure as that of the appliance 114 shown in FIG. 2. The storage device 112 includes the memory 120 identified above, and a processor 221, both of which are also communicatively coupled via the local interface 209. The processor 221 is provided within the storage device 112 because, as explained below in detail, it is difficult for the processor 201 to understand how information that pertains to modification made to a file stored on the storage device 112 is generated and updated in the memory 120 of the storage device 112.

The local interface 209 can be, for example, one or more buses or other wired or wireless connections. The local interface 209 may have additional elements, which are omitted for simplicity, such as controllers, buffers, drivers, repeaters, and receivers, to enable communications. Further, the local interface 209 may include address, control, and/or data connections to enable appropriate communications among the aforementioned components.

The processor 201 is a hardware device for executing code (software and/or firmware), particularly that stored in the memory 207, and the processor 221 is a hardware device for executing code, particularly that stored in the memory 120. Each of the processors 201 and 221 can be any custom made or commercially available processor, a central processing unit (CPU), an auxiliary processor among several processors associated with the appliance 114, a semiconductor based microprocessor in the form of a microchip or chip set, a macroprocessor, or generally any device for executing instructions of a code.

Each of the memories 207 and 120 can include any one or combination of volatile memory cells such as random access memory (RAM) and nonvolatile memory cells such as read-only memory (ROM), hard drive, tape, solid state disk, compact disc (CD), floppy disk, and memory cards (e.g., compact flash memory cards, multimedia memory cards, and secure digital memory cards). Moreover, each of the memories 112 and 120 may incorporate electronic, magnetic, optical, and/or other types of storage media. Note that the memory 207 can have a distributed architecture, where various components are situated remote from one another, but can be accessed by the processor 201. The memory 120 can also have a distributed architecture, where various components are situated remote from one another, but can be accessed by both processors 201 and 221.

Code stored in the memories 207 and 120 may include one or more separate programs, each of which includes an ordered listing of executable instructions for implementing logical functions. In the embodiment shown in the figure, the code in the memory 207 includes a suitable O/S 205. The O/S 205 essentially controls the execution of other computer programs and provides scheduling, input-output control, file and data management, memory management, and communication control and related services.

The file-management system 100 can be a source program, executable program, script, or any other entity comprising a set of instructions to be performed. As described in greater detail below, the file-management system 100 allows users to manage files by generating and updating information pertinent to modifications made to the files. The information is generated or updated in the storage device 112 by the processor 221 of the storage device when a file to which the information pertains is stored in the memory 120 of the storage device 112. The information is updated by the processor 221 when a file to which the information pertains is stored in the memory 120 of the storage device 112 or is accessed from the memory 120 but not saved again in the memory 120 after the access, as will be explained in detail below.

When the file-management system 100 is a source program, the program typically is translated via a compiler, assembler, interpreter, or the like, which may or may not be included within the memory 120, so as to operate properly in connection with the O/S 205. Furthermore, the file-management system 100 can be written as (a) an object oriented programming language, which has classes of data and methods, or (b) a procedural programming language, which has routines, subroutines, and/or functions, for example, but not limited to, C, C++, Pascal, Basic, Fortran, Cobol, Pert, Java, and Ada.

The I/O devices 203 may include input devices, for example, but not limited to, a keyboard, mouse, scanner, and a microphone. Furthermore, the I/O devices 203 may also include output devices, for example, a printer, and a display. Finally, the I/O devices 203 may further include devices that communicate both inputs and outputs, for instance, a modem for accessing another device, system, or network, a radio frequency (RF) or other transceiver, a telephonic interface, a bridge, and a router.

When the appliance 114 is in operation, the processor 201 is configured to execute code stored within the memory 207 of the appliance 114, to communicate data to and from the memory 207, and to generally control operations of the appliance 114 pursuant to the code. Moreover, the processor 201 is configured to execute code stored in the memory 120 of the storage device 112, and to communicate data to and from the memory 120. The O/S 205, in whole or in part, but typically the latter, is read by the processor 201, buffered within the processor 201, and then executed.

Similarly, the processor 221 is configured to execute code stored within the memory 120 of the storage device 112, and to communicate data to and from the memory 120. Moreover, the processor 221 is configured to execute code stored in the memory 207, and to communicate data to and from the memory 207 of the appliance 114. The file-management system 100, in whole or in part, is read by the processor 221, buffered within the processor 221, and then executed.

An alternative embodiment of the file-management system 100 can be implemented in hardware. In such an embodiment, the file-management system 100 is implemented with any or a combination of the following technologies, which are each well known in the art: a discrete logic circuit(s) having logic gates for implementing logic functions upon data signals, an application specific integrated circuit (ASIC) having appropriate combinational logic gates, programmable gate arrays (PGAs), and field programmable gate arrays.

Figure 3:
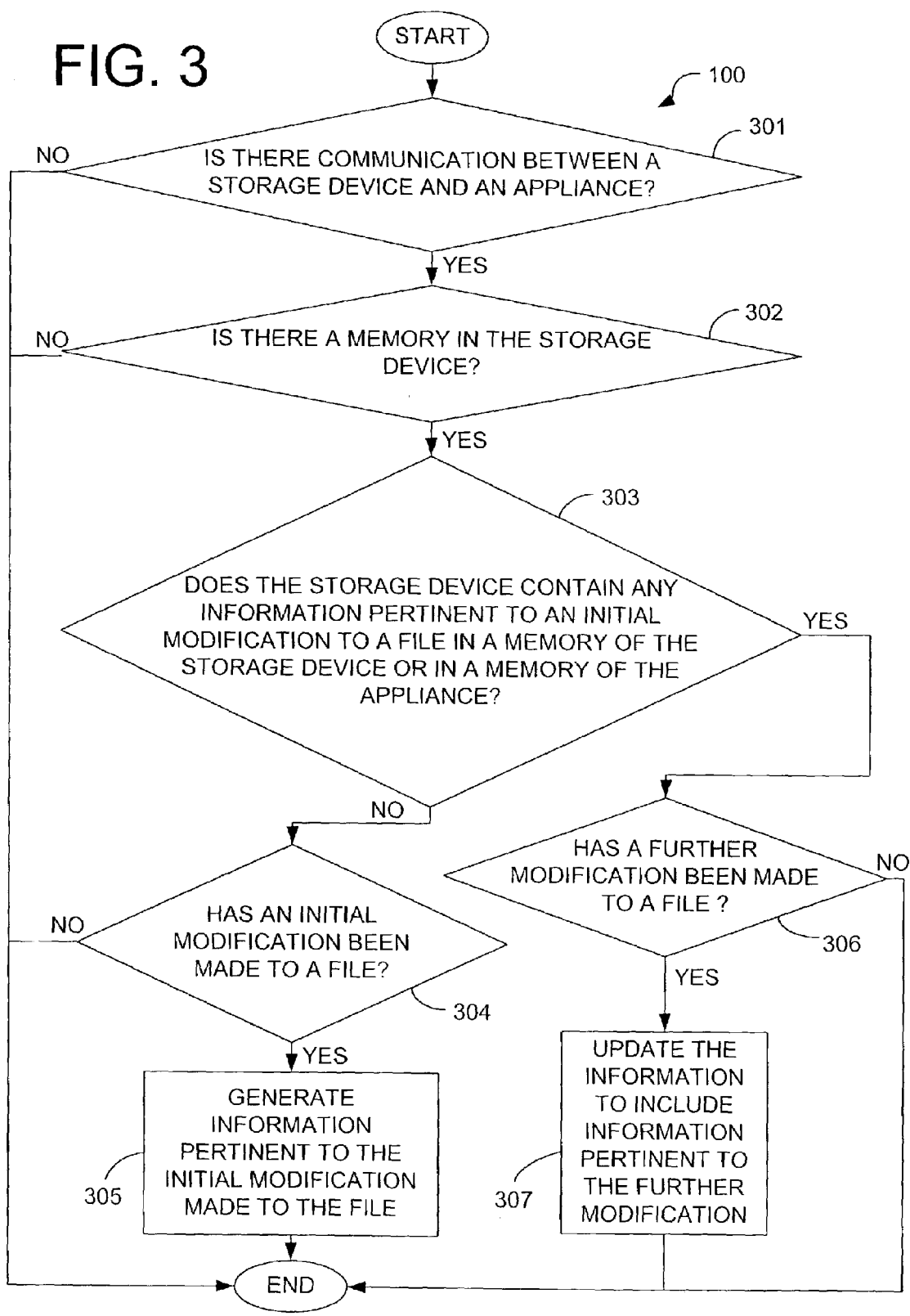
FIG. 3 is a flowchart of an embodiment of a method for storing information to allow users to manage files.

FIG. 3 illustrates an embodiment of a method for storing information to allow users to manage files. Any process descriptions or blocks in this or other flow charts in this file should be understood as representing modules, segments, or portions of code which include one or more executable instructions for implementing specific logical functions or steps in the method, and alternate implementations are included within the scope of the preferred embodiment of the methods for storing information in which functions may be executed out of order from that shown or discussed, including substantially concurrently or in reverse order, depending on the functionality involved, as would be understood by those reasonably skilled in the art of the present invention.

The file-management system 100 (FIG. 2) executes the method. As indicated in step 301, the file-management system 100 first determines whether there is a wired or wireless electrical communication between the appliance 114 and the storage device 112. As an example, communication can comprise a communication that occurs when a universal serial bus (USB) port of the appliance 114 is connected to a USB port of the storage device 112. As a second example, the communication can comprise a transmission from an infrared port of the appliance 114 to an infrared port of the storage device 112. If there is no communication, the method ends. However, if there is communication between the appliance 114 and the storage device 112, the file-management system 100 determines in step 302 whether the storage device 112 includes the memory 120. For instance, if the memory 120 is a CD-ROM, the file-management system 100 determines whether there is a CD-ROM in the storage device 112. If there is no memory 120 in the storage device 112, the method ends. However, if the storage device 120 includes the memory 120, the file-management system 100 then determines in step 303 whether the memory 120 of the storage device 112 includes any information pertinent to an initial modification made to a file. The file is a file that is stored in the memory 207 of the appliance 114 or in the memory 120 of the storage device 112 depending on whether the memory 120 includes any information pertinent to the initial modification as will be explained below in detail. Such information may comprise the name of the file, type of the file, location of the file, type of the initial modification that has been made to the file, if any, and day, date, and time when the initial modification was made. Different types of initial modifications include creating, editing, and moving the file.

If there is no information pertinent to the initial modification stored on the storage device 112, the file-management system 100 determines in step 304 whether an initial modification has been made to the file with the use of the appliance 114. If the initial modification has not been made, the method ends. However, if the initial modification has been made, the file-management system 100 generates information in step 305. This information is information pertinent to the initial modification made to the file. The file-management system 100 generates the information when files to which the information pertains are stored on the file-management system 100 since the processor 221 monitors all files that are being written to and read from the memory 120 of the storage device 112.

With reference back to step 303, if the memory 120 of the storage device 112 includes information pertinent to an initial modification made to a file, the file-management system 100 determines whether a further modification has been made to the file in step 306. Different types of the further modification include editing, moving, and deleting the file. If the further modification has not been made, the method ends. However, if the further modification has been made, the processor 221 updates the information in step 307. The processor 221 updates the information so that the information includes information pertinent to the further modification. For instance, the information may include type of the further modification, and day, date, and time of the further modification.

Figure 4A:
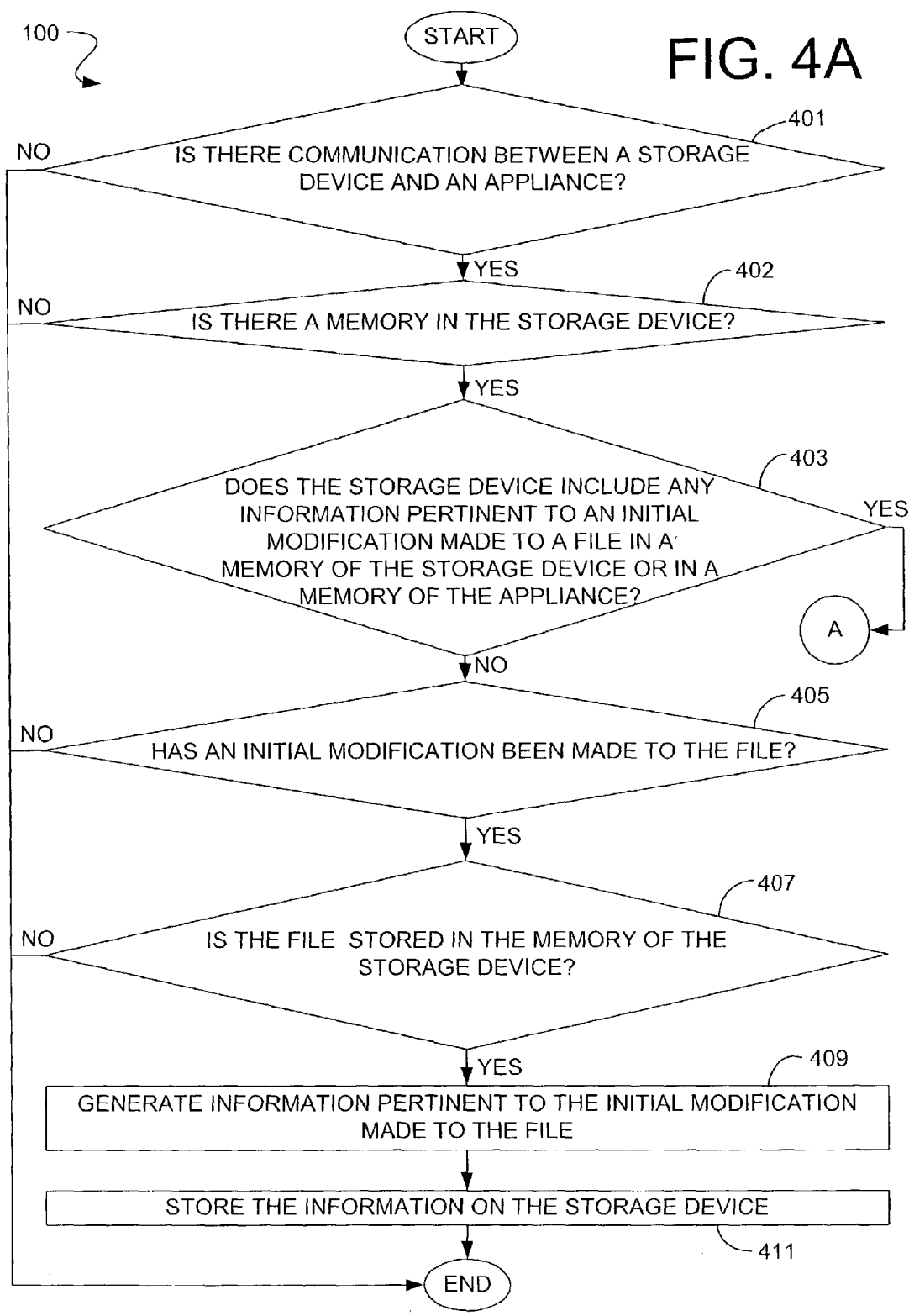
FIGS. 4A-4B are flowcharts of another embodiment of a method for storing information to allow users to manage files.
Figure 4B:
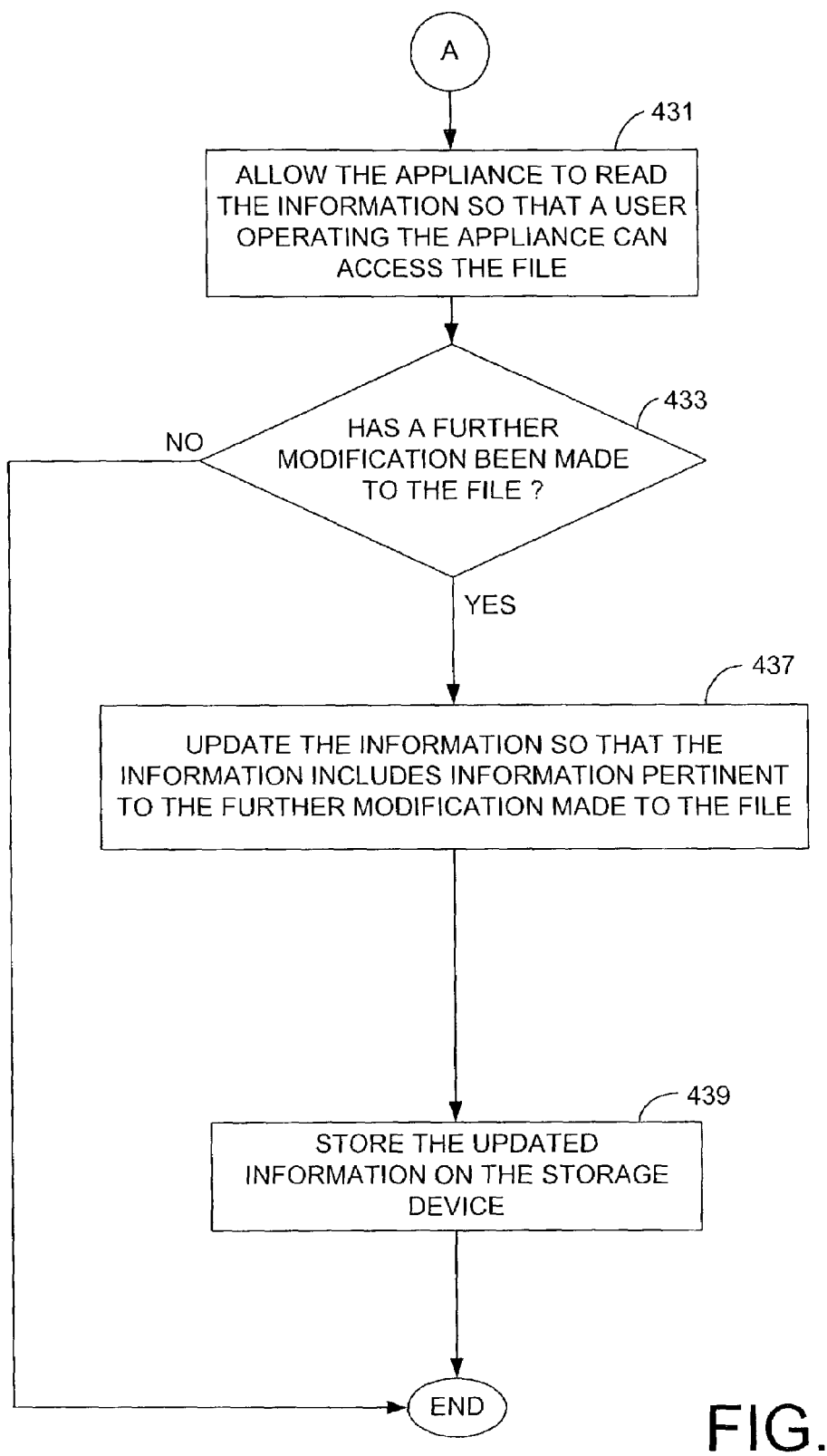

FIGS. 4A-4B illustrate another embodiment of a method for storing information to allow users to manage files. The method starts by determining in step 401 whether there is communication between the appliance 114 (FIG. 2) and the storage device 112 (FIG. 2). If there is no communication, the method ends. If there is communication, the method continues to step 402 to determine whether the memory 120 is located in the storage device 112. For instance, if the memory 120 is a floppy disk, the file-management system 100 determines whether the floppy disk is in the storage device 112. If the storage device does not comprise the memory 120, the method ends. However, if the storage device comprises the memory 120, the method continues to step 403 at which the file-management system 100 determines whether the memory 120 of the storage device 112 includes information that is pertinent to an initial modification made to a file that is stored in the memory 207 of the appliance 114 or in the memory 120 of the storage device 112.

If the storage device 112 does not contain any information pertaining to the initial modification made to a file, the file to which the information pertains can only be stored in the memory 207 of the appliance 114 and cannot be stored in the memory 120 of the storage device 112. The reason that the file can only be stored in the memory 207 if the storage device 112 does not contain any of the information is that the storage device 112 generates the information pertinent to only those files that are stored in the storage device 112. The storage device 112 generates the information pertinent to only those files that are stored in the storage device 112 since the storage device 112 generates the information pertinent to the initial modification made to a file when the file is stored on the storage device 112.

If the storage device 112 does not include any information pertinent to the initial modification made to the file, it is determined in step 405 whether an initial modification has been made by the user 140 (FIG. 1) with the help of the appliance 114 (FIGS. 1-2). Example types of initial modifications include creating, editing and moving the file. An example of an initial modification is when the user 140 opens the file to view the file on the appliance 114, and edits the file. A second example is when the user 140 transfers the file from one directory to another or from one folder to another. If the initial modification has not been made by the user 140, the method ends. On the other hand, if the initial modification has been made, it is determined in step 407 whether the file is stored in the memory 120 of the storage device 112 after making the initial modification. If the file is not stored in the memory 120 of the storage device 112, the method ends.

Alternatively, if the file is stored in the memory 120 of the storage device after making the initial modification, the processor 221 in step 409 (FIG. 2) generates information pertinent to the initial modification made to the file. For instance, if the user 140 opens MacWrite™ II on the appliance 114, creates a file, and saves the file on the storage device 112, the processor 221 generates information regarding the initial modification to the file. The information may include, for example, when the file was created (e.g., day, date, and time of creation). The information further includes the type of modification which is that the file was created. The information also typically comprises the name of the file, for example, "Essay_1.MW2D," where ".MW2D" indicates to the user 140 that the file is a MacWrite™ file. Moreover, the information can include a path to the file, thereby showing the location of the file in the memory 120 of the storage device 112. The path to the file may include directories, sub-directories, folders, and subfolders that include the file. An example of a path is "G:\Writing_class\Essays\Essay_1.MW2D," where G is a directory, Writing_class is a folder, and Essays is a sub-folder. The paths may be visible or invisible to the user 140. For instance, if a file named "Essay1" to which the information pertains, is stored in a subfolder "Essays" of a folder "My Files" in directory A of the memory 120 of the storage device 112, only the name of the file may be visible to the user 140 on a graphical user interface displayed to the user instead of the entire path A:\My Files\Essays\Essay1.

Date, day, and time of the initial modification to the file is the same as date, day, and time, respectively, when the file was stored on the storage device 112 assuming that the file is stored immediately after the initial modification to the file. The reason that the days, dates, and times are the same is because the processor 221 generates the information when the file is stored on the storage device 112. The processor 221 is able to generate the information when the file is stored on the storage device 112 since it recognizes that the file is being stored in the memory 120 and monitors all files that are being written to and read from the memory 120. After the processor 221 generates the information, the processor 221, in step 411, stores the information pertinent to the initial modification in the memory 120 of the storage device 112. The user 140 can then later access the information pertinent to the initial modification stored in the memory 120 of the storage device 112 to know, for instance, day, date, and time of creation of the file.

Returning to step 403, if the storage device 112 does include some information pertinent to the initial modification made to a file, the file-management system 100 allows the appliance 114 to read the information pertinent to the initial modification as indicated in step 431 of FIG. 4B, so that the user 140 can access any file stored in the memory 120 of the storage device 112, including a file that the user recently modified. To explain, if the storage device 112 includes, for, example, the day, date, and time of the creation of a file, the user 140 can open the file using the I/O devices 203 (FIG. 2), for instance, a graphical user interface, after the user 140 selects a path to the file to which the information pertains. The user 140 can select the path, for instance, by selecting, e.g., "clicking" on a link associated with the path presented to the user 140 via a graphical user interface. The link can be presented to the user 140 when the user selects a directory that includes the information. The user 140 can open the file because the file-management system 100 allows the processor 201 to read the information that includes the path. The file-management system 100 allows the user 140 to access the file that was recently modified because a user application that the memory 207 includes and that relates to the file has access to the information. If the file is a MacDraw™ file, MacDraw™ is the user application that relates to the file, and if the file is a Microsoft® Excel™ spreadsheet, Microsoft® Excel™ is the user application that relates to the spreadsheet.

Next, in step 433, the file-management system 100 determines whether a further modification has been made to the file using the appliance 114. The modification is a further modification that is made to the file since the step 433 is executed only if, after step 403 (FIG. 4A), the storage device 112 includes information pertinent to an initial modification made to the file. The storage device 112 includes the information only if the initial modification is made to the file. Hence, in step 433, it is determined whether a further modification is made to the file. Different types of further modification include editing, moving, and deleting the file.

The method ends if the further modification has not been made to the file. On the other hand, if the further modification has been made, step 437 follows in which the file-management system 100 updates the information to include information pertinent to the further modification. For instance, suppose that before the user 140 edits the file in step 433, the information includes the date and time of creation of the file, and that the file was created at that date and time. If the user 140 edits the file in step 433, the information is updated to include the day, date, and time when the file was edited and the fact that the file was edited.

The processor 221 is able to update the information for the same reasons that the processor 221 is able to generate the information in step 409 of FIG. 4A. To explain, when the further modification to a file stored in the memory 120 of the storage device 112 is to edit or move the file, the information is updated when the file is stored in the memory 120 of the storage device 112 after making the further modification. The information is updated when the file is stored on the storage device 112 since the processor 221 of the storage device 112 recognizes that the further modification was made when the file is stored on the storage device 112.

However, when the further modification to the file is to delete the file using the appliance 114, the information is updated when the processor 221 of the storage device 112 recognizes that the file was not stored on the storage device 112 after making the further modification. In other words, the processor 221 of the storage device 112 can recognize that the further modification was made when the file was read from the memory 221 of the storage device 112 by the appliance 114 and not written back into the memory 120 of the storage device 112 after making the further modification. The updated information is then stored in step 439 in the memory 120 of the storage device 112. The user 140 can access the updated information to know, for instance, the day when the file was created, edited, moved and deleted.

It is noted that each of the steps of the method can be stored in each memory module of the memory 120 of the storage device 112, and the processor 221 executes the method. Furthermore, it is also noted that information can be generated in the storage device 112 in step 409 (FIG. 4A) when the storage device 112 is in communication with the appliance 114 and the information can be updated in step 437 when the storage device 112 is in communication with any of the storage devices 116-118. To elaborate, the steps 401-411 (FIG. 4A) can be executed when the storage device 112 is in communication with the appliance 114. The communication can then be disabled between the storage device 112 and the appliance 114 when the storage device is transported to any one of the appliances 116-118. Steps 401-403 and 431-439 can then be executed when the storage device 112 is in communication with any one of the appliances 116-118. Alternatively, information can be generated in the storage device 112 in step 409 when the storage device 112 is in communication with the appliance 114, and the information can be updated in step 437 when the storage device 112 is in communication with the appliance 114. To elaborate, steps 401-411 can be executed when the storage device 112 is in communication with the appliance 114. The storage device 112 is not relocated and the steps 401-403 and 431-439 can then be executed when the storage device 112 is in communication with the appliance 114.

Additionally, it is noted that instead of the processor 221 of the storage device, the processor 201 of the appliance may execute the steps 401-411 and 431-439. However, the execution by the processor 201 may be difficult since the O/S 205 (FIG. 3) would have to be uniquely capable of understanding of how information is generated and updated in the memory 120 of the storage device 112. The processor 221 of the storage device 112 on the other hand is aware of which file is created, edited, or moved then stored in the memory 120 on the storage device 112. Furthermore, the processor 221 is aware of which files are deleted from the memory 120. As stated before, this awareness is due to the fact that files are sent to and from the appliance 114 to the memory 120 of the storage device 112. In contrast, it is difficult for the processor 201 of the appliance 114 to perform the steps 409 and 437 unless the processor 201 has a detailed understanding of how the information is generated and updated in the memory 120 of the storage device 112.

Furthermore, it is noted that the file-management system 100, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this file, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a RAM (electronic), a ROM (electronic), an erasable programmable ROM (EPROM) or Flash memory (electronic), an optical fiber (optical), and a portable CDROM (optical). Note that the computer-readable medium can even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of the systems and methods for storing information includes embodying the functionality of the preferred embodiments of the systems and methods in logic embodied in hardware or software-configured mediums.

It should be emphasized that the above-described embodiments of systems and methods for storing information, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the systems and methods for storing information to allow users to manage files, and protected by the following claims.

What is claimed is:

1. A portable storage device configured to communicate with an appliance, the portable storage device comprising:
   a processor; and
   storage device memory that includes a file management system executable by the processor to generate new file management information pertinent to files when the files are first stored in said memory, to store the new file management information in said memory, and to modify existing file management information already stored in said memory responsive to a file for which the existing file management information being modified by the appliance;
   wherein the file management information is stored in the storage device memory and comprises detailed information regarding manipulation of the file including:
   a first date value indicative of when the file was created in a first location of the storage device memory,
   a second date value indicative of when the file was moved from the first location to a second location in the storage device memory without further modification to said file,
   whether and when the file was edited,
   whether and when the file was deleted.

2. The portable storage device of claim 1, wherein the file management system generates and modifies the file management information when the file is resident in the storage device memory.

3. The portable storage device of claim 1, wherein said modification of the file management information takes place in response to an edit operation in which a content of the file is changed.

4. The portable storage device of claim 1, wherein said modification of the file management information takes place in response to a delete operation in which the file is deleted from the storage device memory.

5. The portable storage device of claim 1, wherein the file management system is configured to detect that a file transferred from the storage device memory to an appliance has been modified by the appliance and to update the file management information associated with said modified file in response to transfer of said modified file by the appliance to the portable storage device for storage in the data storage memory.

6. The portable storage device of claim 1, wherein the file management system is configured to detect that a file transferred from the storage device memory to an appliance has been modified by the appliance and to update the file management information associated with said modified file in response to the appliance not transferring said modified file to the portable storage device for storage in the data storage memory.

7. The portable storage device of claim 1, wherein the processor executes the file management system to generate said indications of when the file was created, edited, moved and deleted responsive to file transfer operations with said appliance.

8. An apparatus comprising a portable storage device configured for communication with an appliance, the portable storage device comprising storage device memory and a file management system, the file management system configured to store, in the memory, file management information associated with a selected file stored in said memory that has been created, edited, moved, and deleted, to transmit the selected file from the memory to the appliance, to detect modification of the transmitted file by the appliance, and to update said file management information resident in the storage device memory to provide a first date value indicative of when the file was created, a second date value indicative of when the file was edited, a third date value indicative of when the file was moved, and a fourth date value indicative of when the file was deleted, in the memory of the portable storage device, of said modifications by the appliance without a corresponding transfer of said modified file to the portable storage device.

9. The apparatus of claim 8, wherein the selected file and the associated file management information are respectively characterized as a first file and first file management information, and wherein the file management system is further configured to store, in the memory, second file management information associated with a second file stored in said memory, to transmit the second file from the memory to the appliance, to detect modification of the transmitted second file by the appliance, and to update the second file management information to provide a record, in the memory of the portable storage device, of said modification by the appliance in response to a transfer of said second modified file to the portable storage device.

10. The apparatus of claim 8, wherein the modification by the appliance comprises a delete operation upon the selected file so that a location of the memory at which the selected file was disposed is available to store a new file, and wherein the updated file management information identifies when the selected file was deleted.

11. The apparatus of claim 8, wherein the portable storage device further comprises a processor and wherein the file management system comprises programming code executed by said processor.

12. The apparatus of claim 8, wherein the memory comprises magnetic storage media.

13. The apparatus of claim 8, wherein the file management information associated with the selected file comprises a name of the selected file and respective date values identifying respective days on which the file was created, edited, moved and deleted.

14. The apparatus of claim 8, in combination with the appliance.

15. The apparatus of claim 14, wherein the appliance comprises a selected one of a digital camera, a printer, a digital telephone, or a personal digital assistant (PDA).

16. A method practiced on a portable storage device for managing files, comprising:
 storing, in memory of the portable storage device, file management information associated with a selected file stored in said memory that has been created, edited, moved, and deleted;
 transmitting the selected file from the memory to an appliance coupled to the portable storage device;
 detecting modification of the transmitted file by the appliance; and
 updating said file management information to provide a first date value indicative of when the file was created, a second date value indicative of when the file was edited, a third date value indicative of when the file was moved, and a fourth date value indicative of when the file was deleted, in the memory of the portable storage device, of said modifications by the appliance without a corresponding transfer of said modified file back to the portable storage device.

17. The method of claim 16, wherein the selected file and the associated file management information are respectively characterized as a first file and first file management information, and wherein the method further comprises:
 storing, in the memory, second file management information associated with a second file stored in said memory;
 transmitting the second file from the memory to the appliance;
 detecting modification of the transmitted second file by the appliance; and
 updating the second file management information to provide, in the memory of the portable storage device, a record of said modification by the appliance in response to a transfer of said second modified file to the portable storage device.

18. The method of claim 16, wherein the modification by the appliance comprises a delete operation upon the selected file so that a location of the memory at which the selected file was disposed is available to store a new file, and wherein the updated file management information identifies when the selected file was deleted.

19. The method of claim 16, wherein the memory is characterized as magnetic storage media.

20. The method of claim 16, wherein the file management information associated with the selected file comprises a name of the selected file and respective date values identifying respective days on which the file was created, edited, moved and deleted.

21. The method of claim 16, wherein the appliance of the transmitting step comprises a selected one of a digital camera, a printer, a digital telephone, or a personal digital assistant (PDA).

22. The method of claim 16, wherein the appliance of the transmitting step is characterized as a first appliance, and wherein the method further comprises steps of repeating the transmitting, detecting and updating steps for a second appliance.

23. The method of claim 16, wherein the portable storage device comprises a processor in communication with said appliance, and wherein the processor carries out the transmitting, detecting and updating steps.

\* \* \* \* \*